United States Patent
Apfel et al.

(10) Patent No.: US 7,185,116 B2
(45) Date of Patent: Feb. 27, 2007

(54) TEMPLATE-BASED CUSTOMIZATION OF A USER INTERFACE FOR A MESSAGING APPLICATION PROGRAM

(75) Inventors: Darren Alexander Apfel, Redmond, WA (US); David Milstein, Kirkland, WA (US); Avner Sander, Bellvue, WA (US)

(73) Assignee: Microsoft Corporation, Redmond, WA (US)

( * ) Notice: Subject to any disclaimer, the term of this patent is extended or adjusted under 35 U.S.C. 154(b) by 830 days.

(21) Appl. No.: 10/330,904

(22) Filed: Dec. 27, 2002

(65) Prior Publication Data

US 2004/0128358 A1  Jul. 1, 2004

(51) Int. Cl.
*G06F 15/16* (2006.01)

(52) U.S. Cl. .................. 709/306; 709/203; 709/206; 715/700; 345/501; 345/530

(58) Field of Classification Search ............... 709/203, 709/206; 345/501, 530; 715/700
See application file for complete search history.

(56) References Cited

U.S. PATENT DOCUMENTS

| | | | |
|---|---|---|---|
| 6,430,624 B1 * | 8/2002 | Jamtgaard et al. | 709/246 |
| 2003/0023755 A1 * | 1/2003 | Harris et al. | 709/246 |
| 2003/0050062 A1 * | 3/2003 | Chen et al. | 455/435 |
| 2003/0121983 A1 * | 7/2003 | Herle | 235/472.01 |
| 2003/0208546 A1 * | 11/2003 | DeSalvo et al. | 709/206 |
| 2004/0019683 A1 * | 1/2004 | Lee et al. | 709/227 |

* cited by examiner

*Primary Examiner*—Saleh Najjar
*Assistant Examiner*—Thuong Nguyen
(74) *Attorney, Agent, or Firm*—Workman Nydegger

(57) ABSTRACT

Mechanisms for a messaging application program (e.g., an e-mail or instant messaging application program) to render information on a display. A server may download different template sets (or the client may otherwise access such template sets) to different client computing systems. Each template is usable by the messaging application program at the respective client to render a display screen in accordance with the display capabilities and/or the user display preferences and settings of the respective client computing system. The messaging application program is allowed to stay the same, while variances due to different display capabilities and/or user display preferences and settings are accommodated by the different template sets.

22 Claims, 4 Drawing Sheets

TEMPLATE-BASED CUSTOMIZATION OF A USER INTERFACE FOR A MESSAGING APPLICATION PROGRAM

BACKGROUND OF THE INVENTION

1. The Field of the Invention

The present invention relates to user interface rendering technology, and more specifically, to mechanisms for performing template-based customization of a user interface for use with a messaging application program.

2. Background and Related Art

Computing technology has revolutionized the way people work and play and has contributed enormously to the advancement of humankind. Computers aid in enumerable applications such as word processing, computer simulations, advanced gaming, voice recognition, among much more. Computing systems now come in a wide-variety of forms including, for example, desktop computers, laptop computers, tablet-form computers, Personal Digital Assistants (PDAs), and even mobile telephones and devices. Such computing systems are often capable of executing messaging application programs such as e-mail or instant messaging application programs.

When a software engineer drafts the source code for a user interface to be used in a messaging application program (e.g., e-mail or instant messaging) on a particular computing system or device (hereinafter both referred to as a "computing system"), the software engineer typically considers the display capabilities of the particular computing system. The software engineer may also consider the predicted needs and desires of the ultimate user of the messaging application program.

Consider, for example, a case in which the software engineer is drafting source code for an instant messaging application. When designing the conversation screen, the software engineer will typical endeavor to layout messaging information on the screen in a manner that is intuitive to the user. For example, there may be a conversation history portion of the display, a text entry portion where the user enters text for possible entry into the conversation, and a presence portion that lists the other participants' presence status (e.g., on-line, off-line, on the phone, or the like). While many computing systems have rich display capabilities, others are more restricted. Accordingly, the software engineer may be quite deliberative and judicious in laying out the display screen.

When drafting a similar instant messaging application program for another device or which has a somewhat different look to accommodate a different user preference, however, the software engineer will often recode the instant messaging application program or draft an entirely different messaging application entirely. As messaging application programs may be quite complex often involving many thousands or lines of interrelated source code, even minor changes to source code may introduce unanticipated deviations from ideal performance.

Accordingly, what would be advantageous are mechanisms that allow a messaging application program such as an e-mail or instant messaging application program to be adapted for use by a wide variety of different computing systems and for a wide variety of user display preferences or settings, without the substantial risk and cost associated with recoding the messaging application program.

BRIEF SUMMARY OF THE INVENTION

The foregoing problems with the prior state of the art are overcome by the principles of the present invention, which are directed towards mechanisms for a messaging application program (e.g., an e-mail or instant messaging application program) to render information on a display in a manner that the messaging application program needs little, if any, recoding in order to be used on a wide variety of computing systems have a wide-variety of display capabilities and associated user display preferences and settings. For example, the layout and feel of an instant messaging program may be altered without actually recoding the instant messaging program. Furthermore, the messaging application program may be used with different devices with only slight, if any, changes to the source code of the messaging application program.

The principles of the present invention may be implemented in a network environment that includes a server computing system connected through a network to a number of client computing systems. In that case, the server computing system may download different template sets to different client computing systems, each template set being usable by the messaging application program at the respective client computing system to render a display screen in accordance with the display capabilities and/or the user display preferences and settings of the respective client computing system. The template sets may have a reference to other data objects (e.g., graphics) that are not suitable for being directly contained in the template. For example, when rendering the presence information for an instant messaging participant, a graphic may be presented on the screen (e.g., a phone to represent that the user is on the phone). In that case, the server may also download different data objects to different client computing systems as appropriate given the display capabilities and/or user display preferences and settings of the respective client computing system.

The server computing system may consider a number of factors when determining which set of templates and/or data objects to download to the client computing system. For example, if the server is associated with the carrier, and the client computing systems were telephonic devices capable of connection to the carrier network, the server computing system may consider the payment plan that the user has subscribed to. A more expensive payment plan may entitle the user to a more robust set of templates that enable more display options.

Another factor may be the current season. For example, if it is close to Halloween, a green pumpkin (or Santa face, or Easter egg as appropriate given the season) data object may be used to represent an instant messaging online status, while a red pumpkin data object may be used to represent an instant messaging offline status. Similarly, a different background image may be used depending on the season. This example assumes a rich display device that has color capability, which brings us to the next factor, display capabilities. For example, a text-only display client will use a set of templates that lack a reference to a graphic. A black-and-white display client will use a set of templates that lack a reference to color. A limited space display device may have templates that instruct for fewer or reduced size items to be displayed.

Another factor may be the user's indicated preference. For example, the server (or an associated computing system) may present a Web page to the user of the client computing system allowing the user to select from one of many sets of templates and/or data objects according to his or her desires.

Although embodiments of the present invention involve the cooperation of the server computing system, the set of templates could be preloaded onto the client computing system, or perhaps have a flash card that stores the templates and/or data objects. If the templates are already delivered to the client computing system, the client computing system may still implement the features of the present invention even without the cooperation of the server computing system.

According, the principles of the present invention allow the messaging application program to remain substantially, if not completely, the same regardless of the appearance of the user interface which renders the application data to the user. This allows the messaging application program to be easily portable to a wide variety of different client computing systems having different display capabilities and/or user preferences and settings.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to mechanisms for a messaging application program (e.g., an e-mail or instant messaging application program) to render information on a display in a manner that the messaging application program needs little, if any, recoding in order to be used on a wide variety of computing systems have a wide-variety of display capabilities and associated user display preferences and settings. The portability of the messaging application program is accomplished using different templates sets that are suitable for different needs. The template sets may differ depending on the display capabilities of the client, the preferences of the user, the current seasons, and even the choice of a carrier that serves the client.

Embodiments within the scope of the present invention include computer-readable media for carrying or having computer-executable instructions or data structures stored thereon. Such computer-readable media can be any available media which can be accessed by a general purpose or special purpose computer. By way of example, and not limitation, such computer-readable media can comprise physical computer-readable media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, any instructions and data which cause a general purpose computer, special purpose computer, or special purpose processing device to perform a certain function or group of functions. The computer-executable instruction may be, for example, binaries, intermediate format instructions such as assembly language, or even source code.

Figure 1:
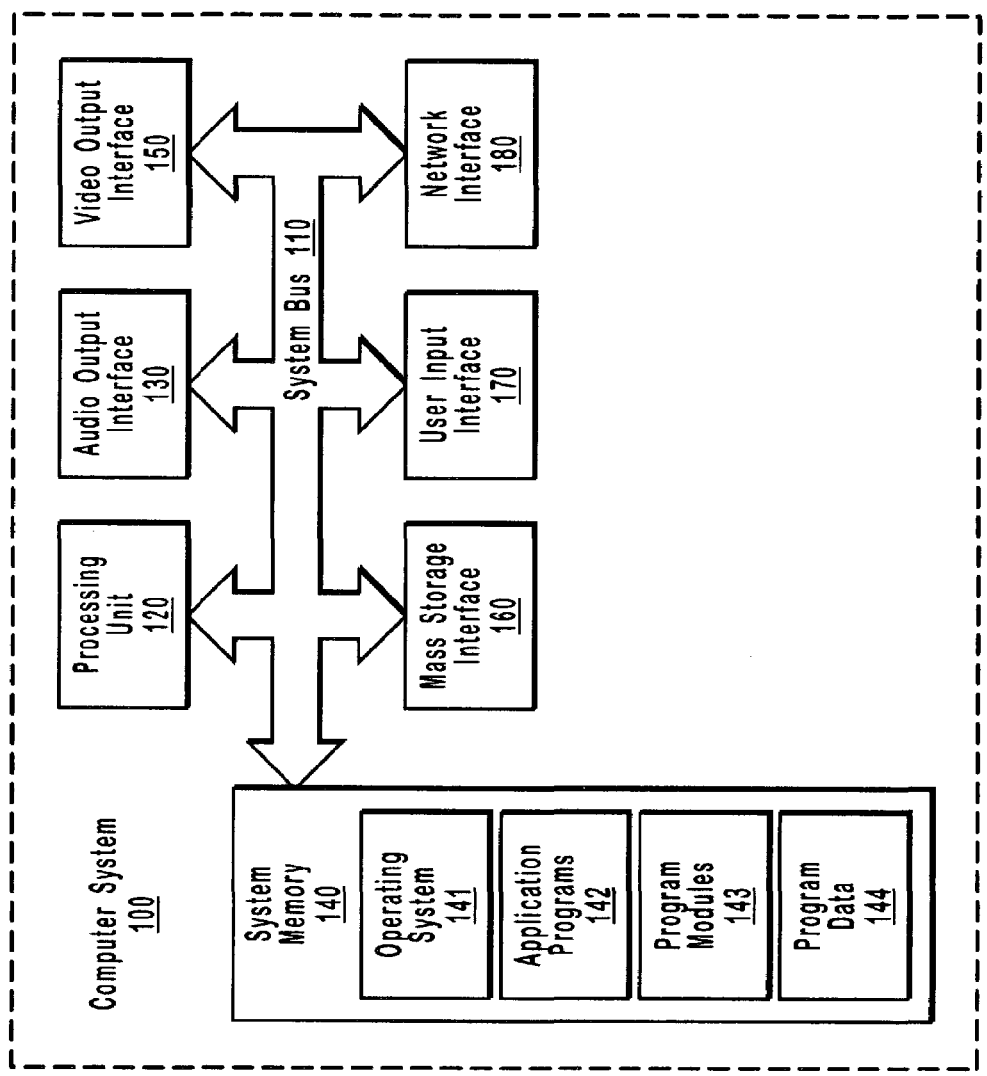
FIG. 1 illustrates a suitable computing system that may implement the features of the present invention.

FIG. 1 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 1, a suitable operating environment for the principles of the invention includes a general-purpose computer system in the form of a computer system 100. Computer system 100 may be, for example, a personal computer that has been adapted to perform the operations disclosed herein.

Computer system 100 includes a user input interface 170 that receives information from an input device, such as, for example, a keyboard, microphone, mouse, or, in the case of a mobile device, a touch pad. An input device can be coupled to user input interface 170 so as to enable the entry of information. An input device may transfer information over such a coupling in response to preprogrammed data or user manipulation of the input device.

Computer system 100 includes a video output interface 150 that provides a video or image output signal to display devices. Computer system 100 may be integrally positioned with or separate from a display device, such as, for example, a color or monochrome computer monitor. A display device can be coupled to video output interface 150 so as to receive a provided video output signal. In the case of a mobile device, the video output interface may interface with a relatively smaller display.

Similarly, computer system 100 includes an audio output interface 130 that provides an audio output signal to external audio output devices. Computer system 100 may also be integrally positioned with or separate from an audio system, which may include a speaker or other device capable of emitting sound data. An audio system can be coupled to audio output interface 130 so as to receive a provided audio output signal.

Computer system 100 includes processing unit 120, which allows for complex and flexible general-purpose processing capabilities. Processing unit 120 executes computer-executable instructions designed to implement features of computer system 100, including features of the present invention. Processing unit 120 is coupled to system bus 110, which also interconnects various other system components including system memory 140.

System memory 140 generally represents a wide variety of volatile and/or non-volatile memories and may include types of memory previously discussed. However, the particular type of memory used in computer system 100 is not important to the present invention. Program code means comprising one or more program modules may be stored in system memory 140. The one or more program modules may include an operating system 141, one or more application programs 142, other program modules 143, and program data 144.

Computer system 100 may also include mass storage interface 160, although mobile telephones or PDAs typically do not have mass storage devices. The mass storage interface 160 can read data from and/or write data to a mass storage device, such as, for example, a magnetic disk or optical disk. A mass storage device can be coupled to mass storage interface 160 so as to enable the reading and writing of data. When a mass storage device is coupled to mass storage interface 160, one or more program modules including operating system 141, application programs 142, other program modules 143, and program data 144 may be stored in the mass storage device.

Computer system 100 is connectable to networks, such as, for example, an office-wide or enterprise-wide computer network, an intranet, the Internet, and/or a carrier network. Computer system 100 includes network interface 180, through which computer system 100 receives data from external sources and/or transmits data to external sources. Computer system 100 may exchange data with external sources, such as, for example, remote processor systems and/or databases over such a network. In the case of a mobile wireless device, the network interface 180 allows the wireless device to communicate over a carrier to other wireless devices and computing systems.

While FIG. 1 illustrates an example of a computing system that may implement the principles of the present invention, any computing system may implement the features of the present invention. In the description and in the claims, a "computing system" is defined broadly as any hardware component or components that are capable of using software to perform one or more functions. Examples of computing systems include desktop computers, laptop computers, Personal Digital Assistants (PDAs), telephones, or any other system or device that has processing capability.

Figure 2:
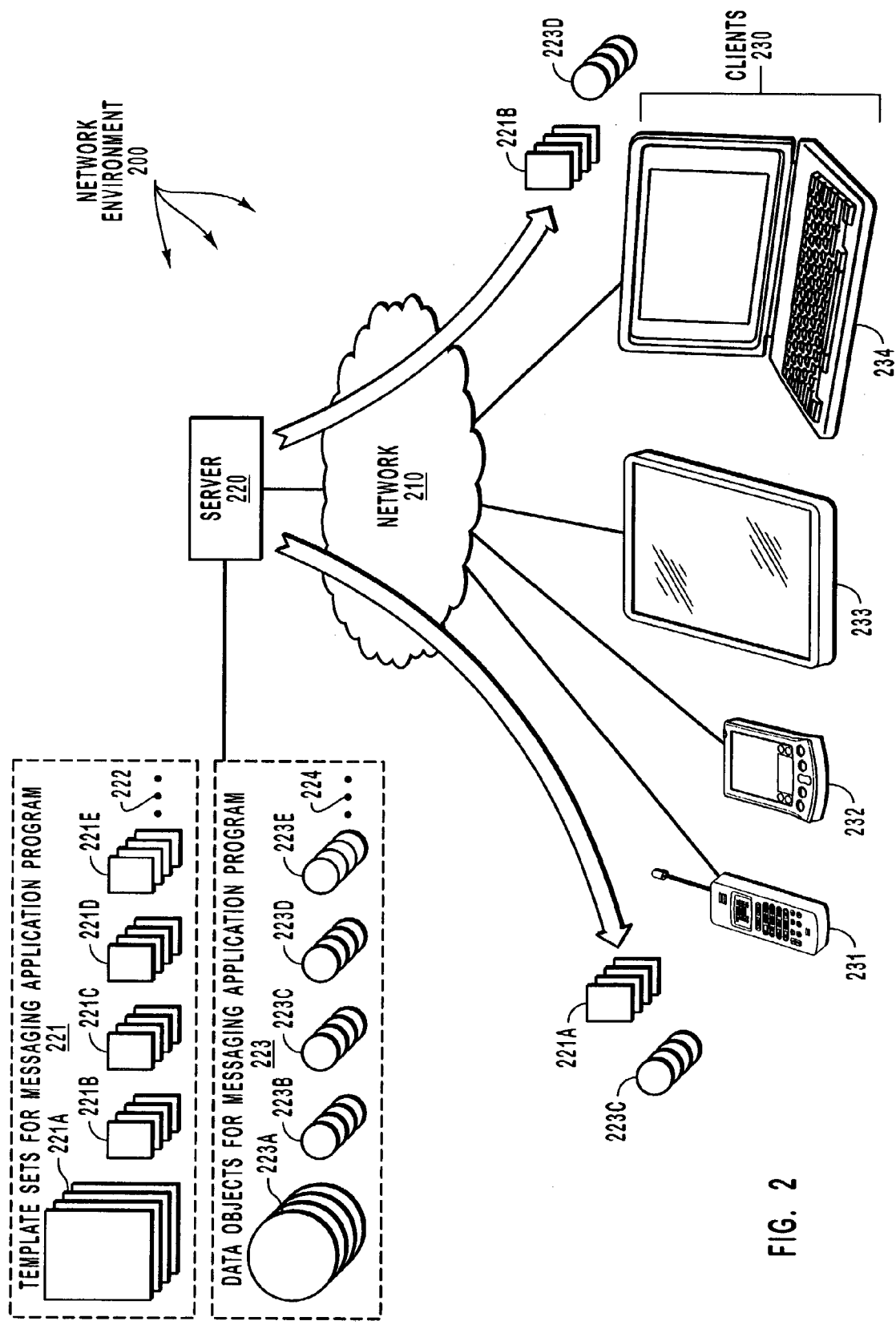
FIG. 2 illustrates a suitable network environment in which the principles of the present invention may be employed.

FIG. 2 illustrates a network environment 200 that includes a server computing system 220 that is capable of communicating over network 210 with a number of client computing systems 230 including clients 231, 232, 233 and 234. To emphasize that the principles of the present invention enable portability of a messaging application program among a variety of different client computing systems having various display capabilities, the client computing systems 230 are illustrated as having a variety of different form factors. For example, client computing system 231 is illustrated as a mobile telephone, client computing system 232 is illustrated as a Personal Digital Assistant, client computing system 233 is illustrated as a tablet-form PC, and client computing system 234 is illustrated as a laptop computing system. Some of these devices may be capable of displaying color, while others may be black-and-white or grayscale. Some devices may be able to display images, while others may be text-only. Also, each of these devices may have different resolutions and screen sizes.

In addition to allowing a common messaging application program to accommodate a variety of different display capabilities, the principles of the present invention also allow for the common messaging application program to accommodate a variety of different user interfaces to adjust to the user display preferences and settings as well. For example, different user screens may be selected by a user, selected by a carrier, or may be used depending on non-selected factors such as the current season or time of year.

In order to accommodate different display capabilities and user display preferences and settings, the server may have access to a number of template sets 221 including template set 221A, 221B, 221C, 221D, 221E among potentially many more as represented by horizontal ellipses 222. Although each template set is configured for use with the same messaging application program, each template set is configured to operate with a client having a specific display capability and/or user preference and setting. Each template in a given template set includes instructions for rendering a display screen suitable for a specific display state of the messaging application program. For example, there may be one template that is used to render an initial instant messaging logon screen, another used to render the conversation screen, and so forth. In one embodiment, the template may include only layout information with the content information being defined by data objects that are either locally generated and maintained, or are part of the data object sets that are now described. The templates may only include references to the data objects.

The server computing system 220 also has access to a number of data objects sets 223 such as, for example, data objects sets 223A, 223B, 223C, 223D, 223E among potentially many more as represented by horizontal ellipses 224. The data object sets may be, for example, image data objects that are selected by the user, by the carrier, or which are default image data objects. Many conventional template formats do not have the current capability to store certain types of information such as, for example, graphics. Instead, those data objects may instead be just referred to in the templates. The templates may be drafted using a language such as, for example, HyperText Markup Language (HTML), extensible HTML (XHTML), or any language that may read, or may be compiled or interpreted to be read, by a computer.

While the image data objects may be text-encoded within the template, the image data objects are simply referred to in the template in the preferred embodiment. This allows for an additional layer of abstraction and customization. Take, for example, a template that is used to render a conversation screen in an instant messaging application. The template may generally refer to an on-line icon that shows that a corresponding instant messaging participant is on-line. The image to represent whether a participant is on-line may be different even without changing the template. Accordingly, the template may dictate the general form of the conversation screen, while the image data objects may allow for additional customization.

For example, data object set 223D may include image data objects that are appropriate given a particular season. For example, during or just before Halloween, the data objects 223D may include a green pumpkin image to represent a user's on-line status, a red pumpkin to represent a user's off-line status, or the like. Similar, other graphics Such as a thumbs-up or thumbs-down, a green or red Santa face, a cracked or whole Easter egg, or other appropriate seasonal symbols may be provided in other data object sets to represent on-line or off-line status. Similarly, different background images or sounds may be provided depending on the season. Simplified graphics data objects that have lower resolution, or are in black-and-white, may be provided for clients that have less display resolution, or do not display color.

The messaging application program renders the display screen as dictated by the template that is used for the current display state of the messaging application program. This may be accomplished by a separate user interface portion of the messaging application program. When the messaging application program encounters a reference to a data object in the template, the messaging application program acquires and renders the data object.

Figure 3:
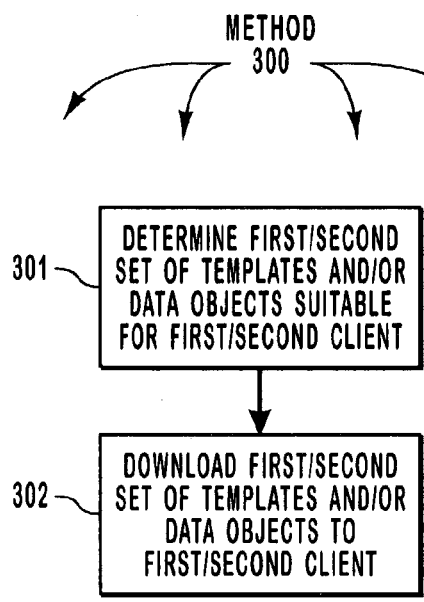
FIG. 3 illustrates a flowchart of a method for a server computing system to facilitate template-based rendering in accordance with the principles of the present invention.

FIG. 3 illustrates a method 300 for the server computing system causing a messaging application program to render information on each of a plurality of client computing systems in accordance with the principles of the present invention. The method includes an act of determining that a first (and a second) set of templates and/or data objects is suitable for a first (and a second) client computing system (act 301). The server computing system then downloads the first (and the second) set of templates and/or data objects to the first (and the second) client computing system (act 302). For example, suppose that client computing system 231 is the first client computing system, and that client computing system 234 is the second client computing system. The first set of templates would be template set 221A, the first set of data objects would be data object set 223C, the second set of templates would be template set 221B, and the second set of data objects would be data object set 223D.

In addition to providing different template and/or data object sets to different client devices, multiple template sets and/or data object sets may be provided to the same client computing system. For example, a richer user experience might allow for the user to choose from multiple template sets and/or data object sets. For example, perhaps in addition to a season-based template/data object set, the user may also select a default template/data object set that the user is more typically familiar with and which is not dependent to a particular season. Or perhaps one template set is used while the user is at home and/or logged in as a client only, and another when the user is at work and logged into a corporate network.

Alternatively, the server computing system may provide a new template set and/or data object set after determining that the previous template set and/or data object set that was provided to the client computing system is no longer appropriate. For example, the user of the client computing system may have paid for the use of the additional set of templates through a new payment plan or subscription. The user of the client computing system may have selected the new template set and/or data object set by, for example, navigating to a Web site and electronically selecting the new template set and/or data object set. Alternatively, the template set may change automatically periodically or upon the occurrence of particular events. For example, within two weeks of a holiday, the server computing system may download a new data object set that is appropriate for the holiday.

The template set includes instructions that are appropriate for the display capabilities of the display device. For example, if the client only included a black-and-white display, the templates may lack any instruction for the client computing system to display color. This would allow the template set to be much smaller, thereby preserving memory and processing resources. This may be particularly important for clients that only display black and white as such devices typically have less robust memory and processor resources than computing systems that are capable of color display. On the other hand, if the client has the capability to display color, the template set may include instructions to display color.

If the client only had a text-only display, then the template would lack instructions for the client computing system to display non-text. Any reference to an image data object would no longer be needed since the display is not capable of displaying images. On the other hand, if the display was capable of displaying images, the template may include references to image data objects.

Although the principles of the present invention have so far been described in a network environment that includes a server computing system in communication with a plurality of client computing systems, the template sets and/or data objects may have been preloaded onto the client computing system at the time of manufacture, or may have been provided other than over a network, such as in a memory card. Regardless of whether the template set and/or data object set was provided over a network, the client computing system may implement the features of the present invention such as in the embodiments now described with respect to FIG. 4 and FIG. 5.

Figure 4:
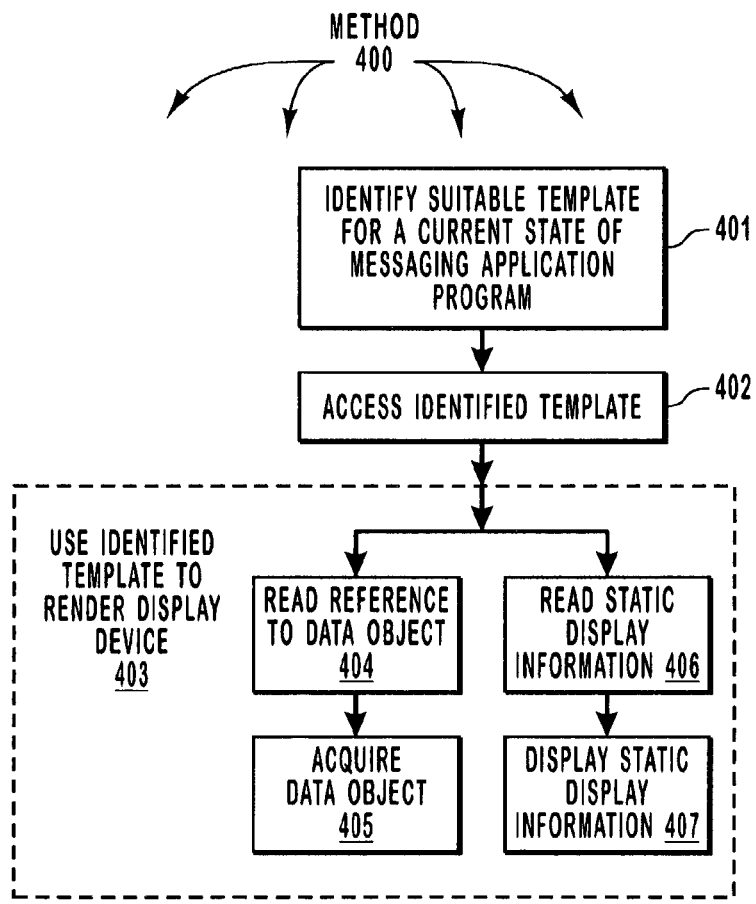
FIG. 4 illustrates a flowchart of a method for a client computing system to perform template-based rendering in accordance with the principles of the present invention.
Figure 5:
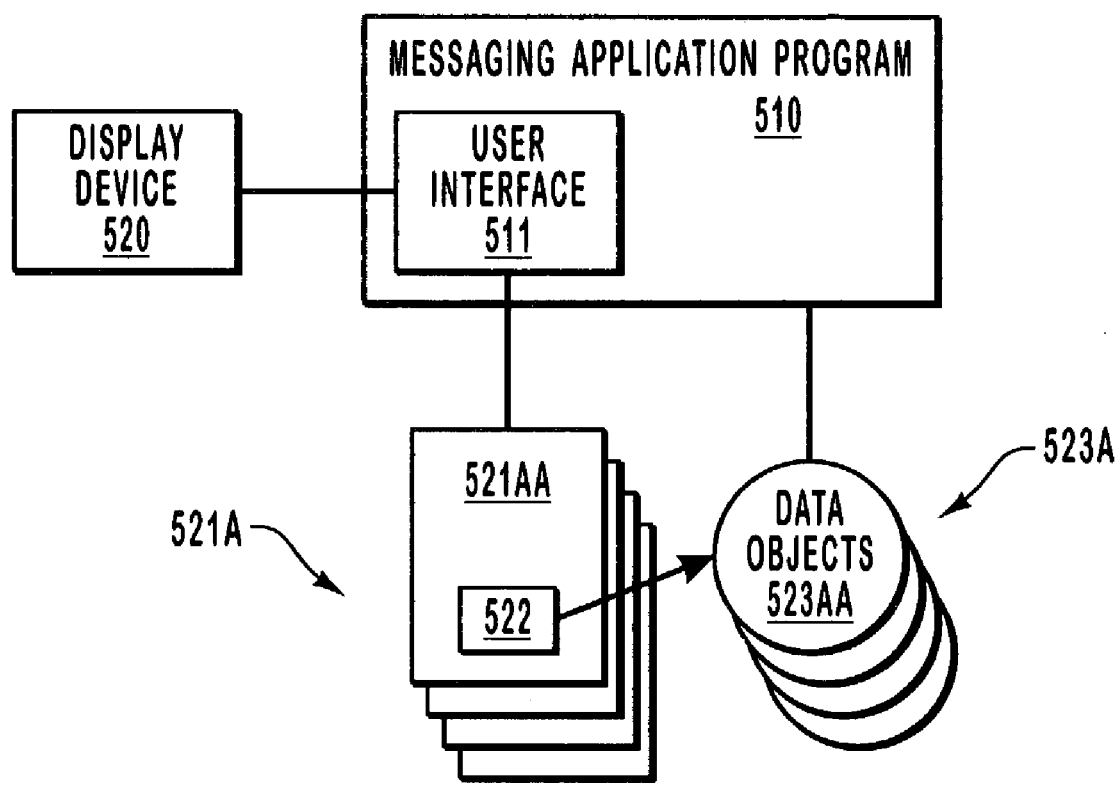
FIG. 5 illustrates an architecture of a messaging application program interacting with various template and object sets in accordance with the principles of the present invention.

FIG. 4 illustrates a method 400 for one of the client computing systems to render messaging information on its display using a messaging application program. FIG. 5 illustrates such a messaging application program 510. The messaging application program 510 includes a user interface 511 which includes one or more modules that render a display screen on display device 520.

The messaging application program 510 (or its user interface 511) identifies a template that is suitable for a current state of the messaging application program given the display capability of the client computing system and the user display preferences and settings (act 401). For example, suppose for the sake of clarity, that the messaging application program only includes one template set 521A. Now suppose that template 521AA is the template within that template set that identifies the setup of the conversation screen in the messaging application program. If the messaging application program 510 is currently in the conversation mode, then the messaging application program 510 (or its user interface 511) will identify the template 521AA as the relevant template.

The messaging application program 510 (or its user interface 511) accesses the identified template (act 402) and the uses the accessed template to render information on a display of the client computing system (act 403). More specifically, the user interface 511 reads static display information from the accessed template (act 406), then displays the display information on the display as dictated by the accessed template (act 407).

In addition, the template includes one or more references to data objects (e.g., username, image data objects, or dynamically changing pieces of information). The data objects may include data objects provided by the server, or may include other dynamically changing or custom pieces of data such as username. For clarity, the template 521AA is illustrated as including data object reference 522. The arrow conveys that the data object reference 522 points to a specific data object (e.g., an on-line presence indicating image) such as data object 523AA. The data object set 523A that the data object 523AA belongs to represents a set of data objects that may be referred to by the template set 521A.

The messaging application program 510 then reads the reference to a data object and a position for rendering the data object on the display from the accessed template (act 404), and then acquires and displays the data object using the reference (act 405).

The messaging application program 510 itself need not be significantly different in order to be portable to different computing systems with different display capabilities and/or user display preferences and settings. The user interface 511 includes standard code that operates to display the display screen as dictated by the corresponding template. In addition, that standard code does not depend on the template set or on the data objects. The template set and/or the data object set may be changed within any change in the code operating the user interface. The user interface is configured to read the template and render the information as dictated by the template regardless of the content of the template or the identity of the data objects.

Accordingly, the principles of the present invention allow a messaging application program to display messaging information in a variety of different manners to accommodate the different display capabilities and user display preferences and settings of different client computing systems. Accordingly, the messaging application program may be more easily reconfigured to operate on different devices and with different user experiences without having to perform significant recoding of the messaging application program. The only different in the messaging application program is that there may be some display capabilities on one device (e.g., image rendering) that are not present on other devices. Accordingly, the messaging application program on the text-only display device need not have code that access images. Such functionality may be disabled in the messaging application program with little, if any, code modifications. Accordingly, there would be relatively little risk of introducing degradations in performance by disabling such functions. In this fashion, the messaging application program may be easily ported to different client and accommodate a variety of user experiences on each client.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a network environment that includes a server computing system connected through a network to a plurality of client computing systems having various display capabilities and user display preferences, a method for the server computing system causing a messaging application program to render information on each of the plurality of client computing systems with little, if any, required recoding of the messaging application program to accommodate at least one of the varying display capabilities and the user display preferences of the different client computing systems, the method comprising the following:

an act of receiving a first user-selection of a first set of templates from a first client computing system having a text-only display, the first user-selection identifying the first set of templates from among one or more sets of templates that can generate renderable information for the first computing system based on first user preferences for rendering information at the first client computer system, the first selected set of templates lacking any instruction for the first client computing system to display non-text;

an act of determining that a the first selected set of templates is suitable for the first client computing system based on the first user preferences, wherein determining suitability includes each of the first selected set of templates being usable at the first client computing system to render a display screen at the first client computing system in accordance with the first user preferences;

an act of downloading the first selected set of templates to the first client computing system;

an act of receiving a second user-selection of a second set of templates from a second different client computing system having graphical display capable of displaying graphics, the second user-selection identifying the second set of templates from among one or more sets of templates that can generate renderable information for the second computing system based on second user preferences for rendering information at the second client computer system such that the first and second user-preferences cause renderable information from the server computer system to be customized differently at the first and second client computer systems respectively, the second selected set of templates including at least one instruction for the second computing system to display graphics;

an act of determining that the second selected set of templates is suitable for the second client computing system based on the second user preferences, each of the second selected set of templates being usable the second client computing system to render the display screen at the second client computing system in accordance with the second user preferences, the first selected set of templates being different than the second selected set of templates;

an act of downloading the second selected set of templates to the second client computing system;

an act of rendering the display screen at the first computing device as dictated by a template in the first set of templates; and an act of rendering the display screen at the second computing device as dictated by a template in the second set of templates.

2. A method in accordance with claim 1, wherein a display of the first client computing system is a black and white display, the first selected set of templates lacking any instruction for the first client computing system to display color, and wherein a display of the second client computing system is a color display, the second selected set of templates including at least one instruction for the second client computing system to display color.

3. A method in accordance with claim 1, wherein the act of determining that the first selected set of templates is suitable for the first client computing system comprises the following:

an act of determining that a user of the first client computing system has paid for the use of the first selected set of templates.

4. A method in accordance with claim 1, wherein the act of determining that the first selected set of templates is suitable for the first client computing system comprises the following:

an act of determining that a user of the first client computing system has selected the first selected set of templates.

5. A method in accordance with claim 1, wherein the act of determining that the first selected set of templates is suitable for the first client computing system comprises the following:

an act of determining that it is close to a particular season, the first selected set of templates adapted for use during the particular season.

6. A computer program product for use in a network environment that includes a server computing system connected through a network to a plurality of client computing systems having various display capabilities and user display preferences, the computer program product for implementing a method for the server computing system causing a messaging application program to render information on each of the plurality of client computing systems with little, if any, required recoding of the messaging application program to accommodate at least one of the varying display capabilities and the user display preferences of the different client computing systems, the computer program product comprising one or more computer-readable media have thereon the following:

computer-executable instructions for receiving a first user-selection of a first set of templates from a first client computing system having a text-only display, the first user-selection identifying the first set of templates from among one or more sets of templates that can generate renderable information for the first computing system based on first user preferences for rendering information at the first client computer system, the first set of templates lacking any instruction for the first computing system to display non-text;

computer-executable instructions for determining that a first selected set of templates is suitable for a first client computing system based on the first user preferences, each of the first selected set of templates being usable at the first client computing system to render a display screen at the first client computing system in accordance with the first user preferences;

computer-executable instructions for causing the first selected set of templates to be downloaded to the first client computing system;

computer-executable instructions receiving a second user-selection of a second set of templates from a second different client computing system having graphical display capable of displaying graphics, the second user-selection identifying the second set of templates from among one or more sets of templates that can generate renderable information for the second computing system based on second user preferences for rendering information at the second client computer system such that first and second user-preferences cause renderable information from the server computer system to be customized differently at the first and second client computer systems respectively, the second selected set of templates including at least one instruction for the second computing system to display graphics;

computer-executable instructions for determining that a second selected set of templates is suitable for a second client computing system based on the second user preferences, each of the second selected set of templates being usable at the second client computing system to render the display screen at the second client computing system in accordance with the second user preferences, the first selected set of templates being different than the second selected set of templates; and computer-executable instructions for causing the second selected set of templates to be downloaded to the second client computing system.

computer-executable instructions for rendering the display screen at the first computing device as dictated by a template in the first set of templates; and computer-executable instructions for rendering the display screen at the second computing device as dictated by a template in the second set of templates.

7. A computer program product in accordance with claim 6, wherein the computer-executable instructions for determining that the first selected set of templates is suitable for the first client computing system comprise the following:

computer-executable instructions for determining that a user of the first client computing system has paid for the use of the first selected set of templates.

8. A computer program product in accordance with claim 6, wherein the computer-executable instructions for determining that the first selected set of templates is suitable for the first client computing system comprise the following:

computer-executable instructions for determining that a user of the first client computing system has determined to use the first selected set of templates.

9. A computer program product in accordance with claim 6, wherein the computer-executable instructions for determining that the first selected set of templates is suitable for the first client computing system comprise the following:

computer-executable instructions for determining that it is close to a particular season, the first selected set of templates adapted for use during the particular season.

10. A computer program product in accordance with claim 6, wherein the one or more computer-readable media are physical memory media.

11. A computer program product in accordance with claim 10, wherein the physical memory media is system memory.

12. A computer program product in accordance with claim 10, wherein the physical memory media is persistent storage media.

13. In a network environment that includes a server computing system connected through a network to a plurality of client computing systems having various display capabilities and user display preferences, a method for the server computing system causing a messaging application program to render information on each of the plurality of client computing systems with little, if any, required recoding of the messaging application program to accommodate at least one of the varying display capabilities and the user display preferences of the different client computing systems, the method comprising the following:

an act of receiving a first user-customization of a first set of data objects from a first client computing system having a text-only display, the first user-customization identifying the first set of data objects from among one or more sets of data objects that can generate renderable information for the first computing system based on first user preferences for rendering information at the first client computer system, the first set of data objects lacking any instruction for the first client computing system to display non-text;

an act of determining that a first customized data object referred to in a first set of templates is suitable for display at the first client computing system based on the first user preferences, each of the first set of templates being usable at the first client computing system to render a display screen at the first client computing system in accordance with the first user preferences, the first set of templates being templates that are either already at a first client computing system or are to be downloaded to the first client computing system;

an act of downloading the first customized data object to the first client computing system;

an act of receiving a second user-customization of a second set of data objects from a second different client computing system having a graphical display capable of displaying graphics, the second user-customization identifying the second set of data objects from among one or more sets of data objects that can generate renderable information for the second computing system based on second user preferences for rendering information at the second client computer system such that the first and second user-preferences cause renderable information from the server computer system to be customized differently at the first and second client computer systems respectively, the second set of data objects including at least one instruction for the second computing system to display graphics;

an act of determining that a second customized data object referred to in a second selected set of templates is suitable for display at the second client computing system based on the second user preferences, each of the second selected set of templates being usable at the second client computing system to render the display screen at the second client computing system in accordance with the second user preferences, the second selected set of templates being templates that are either already at a second client computing system or are to be downloaded to the second client computing system;

an act of downloading the second customized data object to the second client computing system;

an act of rendering the display screen at the first computing device as dictated by a template in the first set of templates; and an act of rendering the display screen at the second computing device as dictated by a template in the second set of templates.

14. A method in accordance with claim 13, wherein the first customized data object is a picture.

15. A method in accordance with claim 14, wherein the first customized data object is an image representing an instant messaging presence status.

16. A method in accordance with claim 14, wherein the first customized data object is a background image.

17. A method in accordance with claim 13, wherein the first set of templates is different than the second set of templates.

18. A method in accordance with claim 13, wherein the first set of templates is the same as the second set of templates.

19. A computer program product for use in a network environment that includes a server computing system connected through a network to a plurality of client computing systems having various display capabilities and user display preferences, the computer program product for implementing a method for the server computing system causing a messaging application program to render information on each of the plurality of client computing systems with little, if any, required recoding of the messaging application program to accommodate at least one of the varying display capabilities and the user display preferences of the different client computing systems, the computer program product comprising one or more computer-readable media having thereon the following:

computer-executable instructions receiving a first user-customization of a first set of data objects from a first client computing system having a text-only display, the first user-customization identifying the first set of data objects from among one or more sets of data objects that can generate renderable information for the first computing system based on first user preferences for rendering information at the first client computer system, the first set of data objects lacking any instruction for the first client computing system to display non-text;

computer-executable instructions for determining that a first customized data object referred to in a first set of templates is suitable for display at the first client computing system based on the first user preferences, each of the first set of templates being usable at the first client computing system to render a display screen at the first client computing system in accordance with the first user preferences, the first set of templates being templates that are either already at a first client computing system or are to be downloaded to the first client computing system;

computer-executable instructions for causing the first customized data object to be downloaded to the first client computing system;

computer-executable instructions for receiving a second user-customization of a second set of data objects from a second different client computing system having a graphical display capable of displaying graphics, the second user-customization identifying the second set of data objects from among one or more sets of data objects that can generate renderable information for the second computing system based on second user preferences for rendering information at the second client computer system such that the firs tans second user-preferences cause renderable information from the server computer system to be customized differently at the first and second client computer systems respectively, the second set of data objects including at least one instruction for the second computing system to display graphics;

computer-executable instructions for determining that a second customized data object referred to in a second selected set of templates is suitable for display at the second client computing system based on the second user preferences, each of the second selected set of templates being usable at the second client computing system to render the display screen at the second client computing system in accordance with the second user preferences, the second set of templates being templates that are either already at a second client computing system or are to be downloaded to the second client computing system;

computer-executable instructions for causing the second customized data object to be downloaded to the second client computing system;

computer-executable instructions for rendering the display screen at the first computing device as dictated by a template in the first set of templates; and computer-executable instructions for rendering the display screen at the second computing device as dictated by a template in the second set of templates.

20. A computer program product in accordance with claim 19, wherein the one or more computer-readable media are physical memory media.

21. A computer program product in accordance with claim 20, wherein the physical memory media is system memory.

22. A computer program product in accordance with claim 20, wherein the physical memory media is persistent storage media.

* * * * *